R. R. HUGHES, Jr.
SEWING MACHINE.
APPLICATION FILED MAR. 19, 1915.
1,329,245. Patented Jan. 27, 1920.
5 SHEETS—SHEET 4.
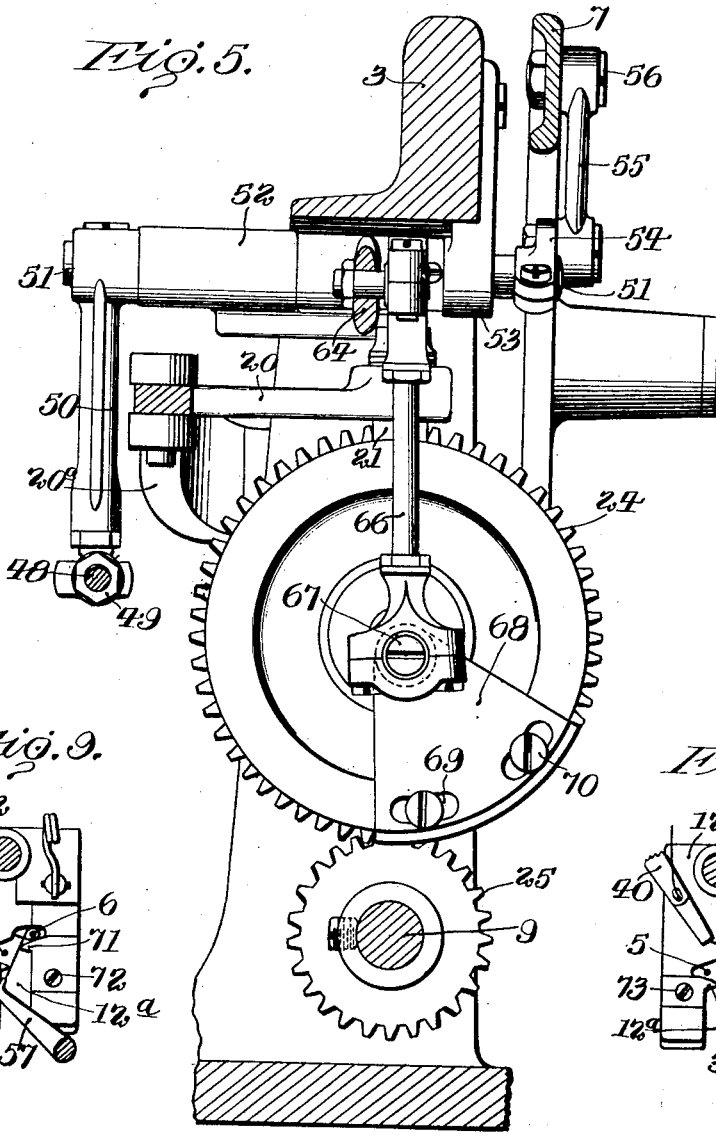
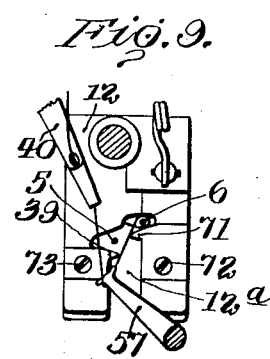
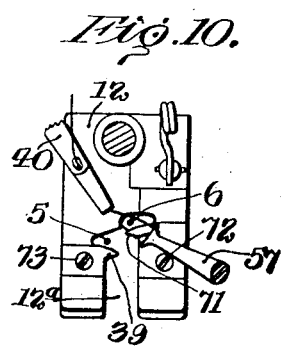
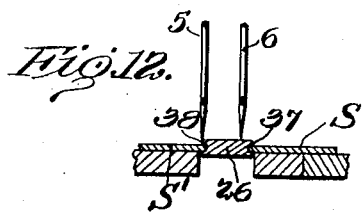

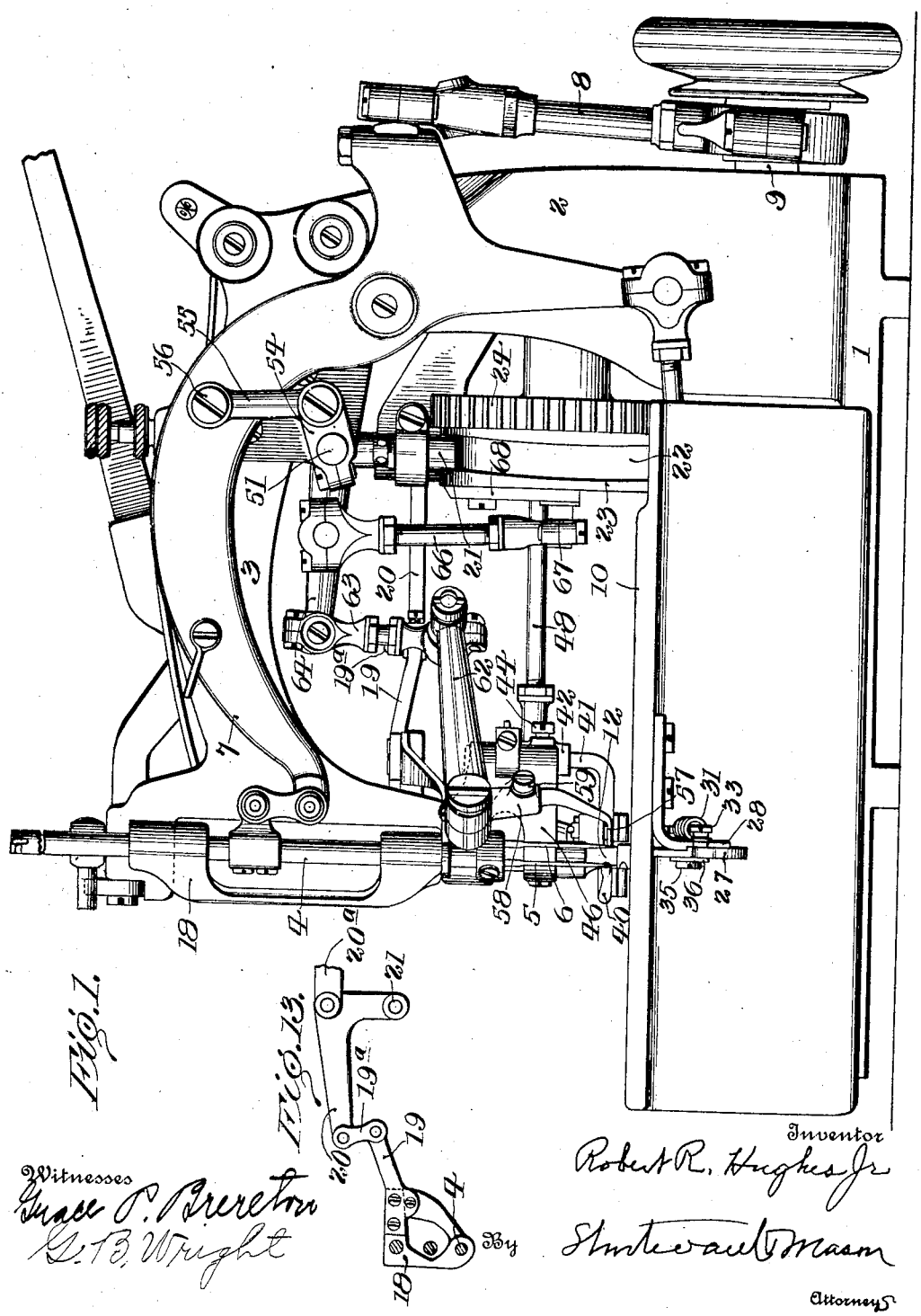

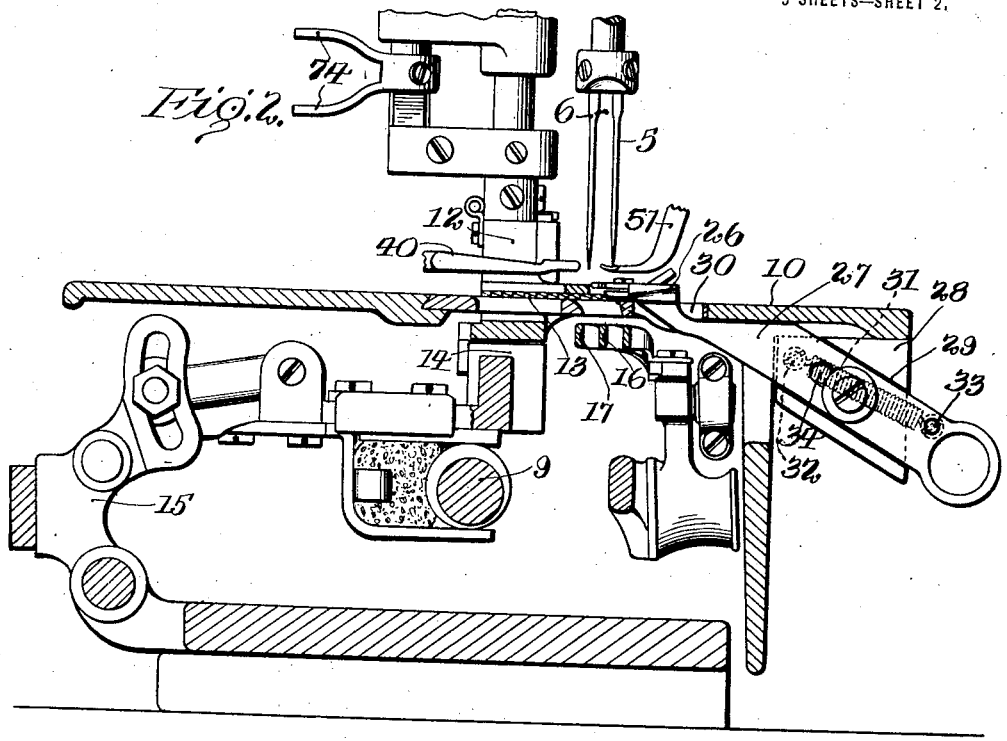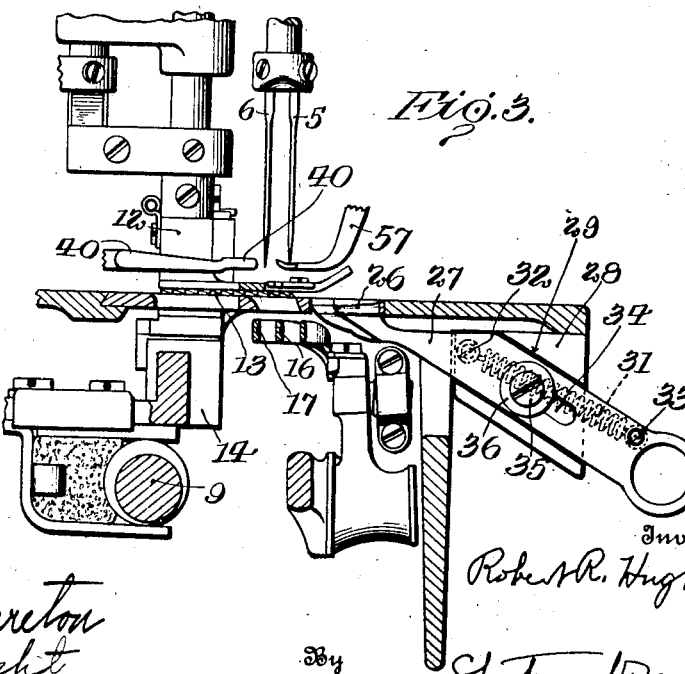

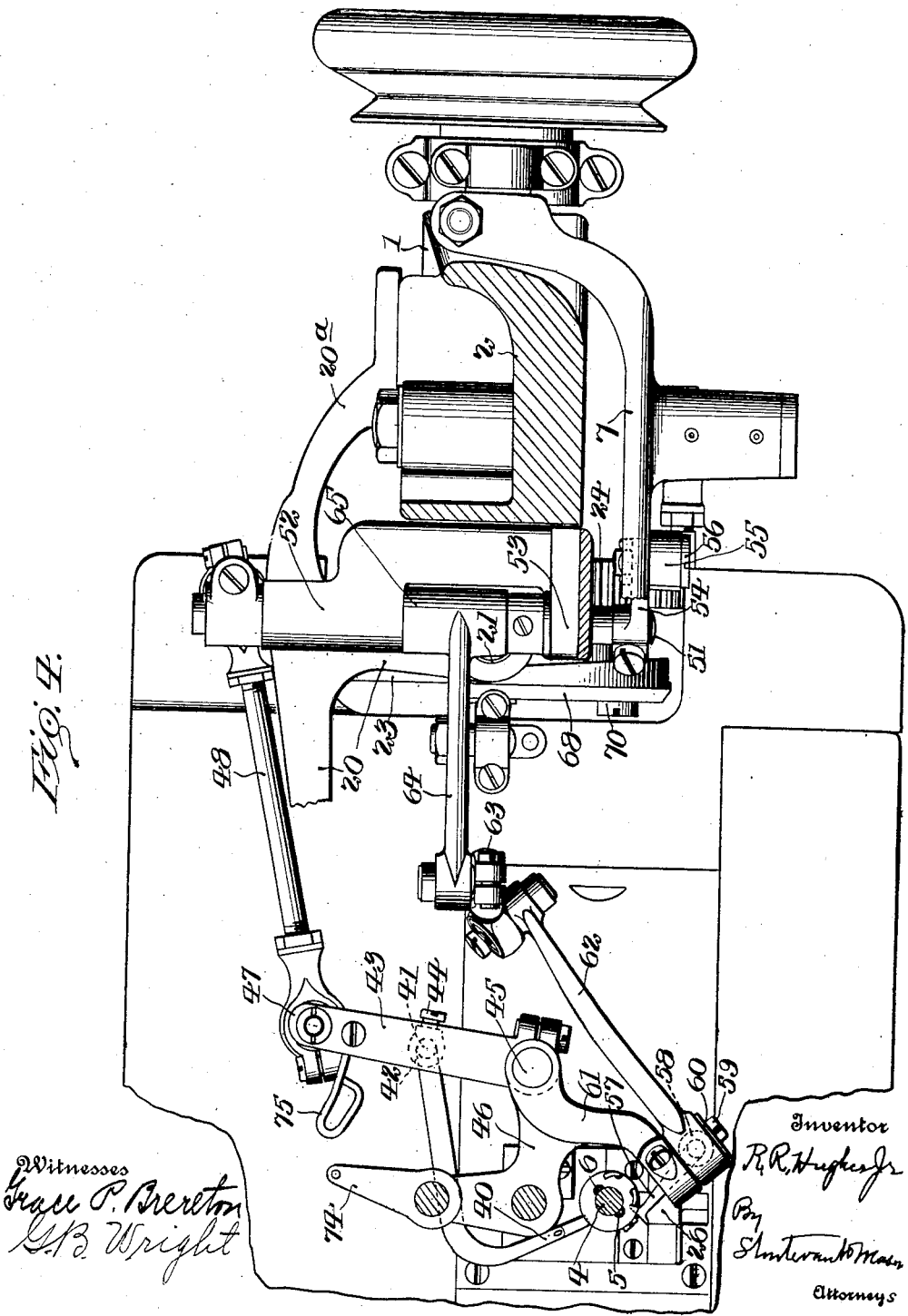

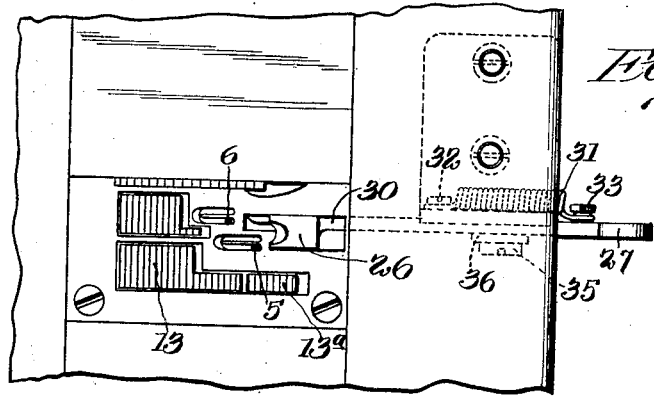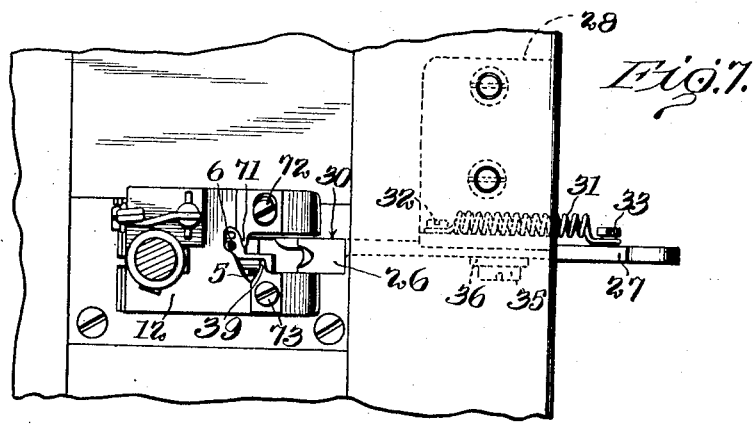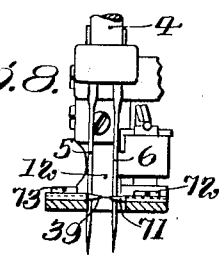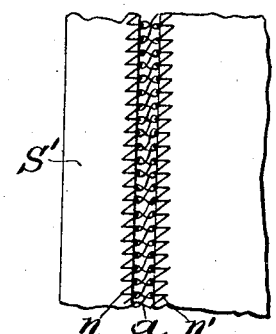

UNITED STATES PATENT OFFICE.

ROBERT R. HUGHES, JR., OF NEW YORK, N. Y., ASSIGNOR TO UNION SPECIAL MACHINE COMPANY, OF CHICAGO, ILLINOIS, A CORPORATION OF ILLINOIS.

SEWING-MACHINE.

1,329,245.     Specification of Letters Patent.     Patented Jan. 27, 1920.

Application filed March 19, 1915. Serial No. 15,448.

*To all whom it may concern:*

Be it known that I, ROBERT R. HUGHES, Jr., a citizen of the United States, residing at New York, in the county of New York, State of New York, have invented certain new and useful Improvements in Sewing-Machines, of which the following is a description, reference being had to the accompanying drawing and to the figures of reference marked thereon.

The invention relates to new and useful improvements in sewing machines, and more particularly to sewing machines which are adapted to connect by lines of thread the spaced edges of fabric sections.

An object of the invention is to provide a sewing machine of the above character which may be used for finishing the necks and armholes of knitted undervests, and wherein a guide for guiding the spaced edges of the fabric may be withdrawn at the will of the operator for the finishing operation.

A further object of the invention is to provide a machine of the above character with means for forming a cross thread into a figure 8, and presenting the same to the needles, so that the spaced edges of the fabric will be joined by said cross threads.

A still further object of the invention is to provide a machine of the above character having a movable thread guide and a movable thread hook with a retaining finger which coöperates with said guide and hook for forming the cross threads into loops and positioning the same for the entrance of the needles.

A still further object of the invention is to provide an improved mechanism for operating the thread guide and thread hook, whereby the same may be positively actuated and properly adjusted so as to coöperate with the needles.

These and other objects will in part be obvious and will in part be hereinafter more fully described.

In the drawings, which show by way of illustration one embodiment of the invention,—

Figure 1 is a front view of a sewing machine embodying my improvements;

Fig. 2 is a vertical sectional view on the line of feed, showing the guide for the edges of the material raised and in operative position;

Fig. 3 is a view similar to Fig. 2, with the guide lowered to inoperative position;

Fig. 4 is a view partly in horizontal section and partly in top plan, showing the operating mechanism for the thread guide and the thread hook;

Fig. 5 is a vertical sectional view showing a part of the actuating devices for the thread guide and the thread hook;

Fig. 6 is a plan view of a portion of the work support, showing the guide for the fabric edges raised and in operative position;

Fig. 7 is a similar view, showing the guide lowered to inoperative position;

Fig. 8 is a detail in section through the presser foot, showing the position of the needles relative to the retaining fingers;

Fig. 9 is a detail in plan, showing the presser foot, the thread guide, the movable thread hook and the retaining finger, the parts being positioned for forming a loop for the left hand needle;

Fig. 10 is a similar view showing the parts positioned for the right hand needle.

Fig. 11 is a detail showing two sections of fabric joined by my improved stitching mechanism;

Fig. 12 is a sectional view, showing the guide in normal position and the fabrics guided thereby.

Fig. 13 is a detail in plan of the needle bar vibrating means.

The invention generally consists in providing a sewing machine having spaced needles with complemental stitch-forming devices which form independent rows of stitching. These rows of stitching are preferably zigzag, one needle puncture entering the edge of the fabric while the other passes over the edge of the fabric. The fabric sections are fed to the needles so that the edges are spaced and the two needles operate upon the respective edges. Means is provided for laying a cross thread between the edges, so as to connect them as they are stitched, and this cross thread forming means includes a thread guide, a double thread hook and a loop-spreading finger which coöperates with the hook in spreading the loop for the entrance of one of the needles.

The machine also includes positively actuated devices for the thread hooks and means whereby the working position of the thread hook may be readily adjusted.

The machine further includes a guide for guiding the spaced edges of the fabric, which guide may be readily withdrawn from normal operating position to permit the finishing operation.

My improved machine is especially designed for finishing the necks and armholes of knitted undervests. In finishing the armhole, which is tubular, it is necessary to withdraw the guide which extends between the edges, so as to permit the cross threads which are first formed, to pass over the top of the guide, so that the end of the line of stitching may overlap the beginning of the line of stitching.

Referring more in detail to the drawings, my improved machine consists of a supporting bed 1 having a standard 2 carrying an overhanging arm 3, in which reciprocates the needle bar 4. The needle bar 4, as herein shown, carries two spaced needles 5 and 6 which are set in a line diagonal of the line of feed. The needle bar is reciprocated by a needle lever 7, oscillated by a link 8 coöperating with an eccentric on the main shaft 9.

A work support 10 is carried by the bed 1. The material to be stitched is held on the work support by a presser foot 12. Said presser foot has a slot 12ª extending to the front end to receive a fabric guide to be hereinafter described. The material is fed over the work support by a feed dog 13, carried by a feed bar 14, reciprocated by a feed rocker 15.

The feeding mechanism, as herein shown, consists of the main feed dog 13 and an auxiliary feed dog 13ª, which may be given a differential movement relative to the main feed dog. This feeding mechanism, however, forms no part of the present invention and will not be further described.

Coöperating with the needle 5 beneath the work support is a looper 16, while coöperating with the needle 6 beneath the work support is a looper 17. The needles, therefore, form two separate lines of stitching.

The needle bar 4 is mounted to reciprocate in a swinging gate 18, pivoted to the overhanging arm. Secured to the gate 18 is an arm 19, which is connected by a link 19ª to a rocking frame 20, fulcrumed on a bracket 20ª, carried by the standard 2. These parts operate in a horizontal plane and consequently, when the frame is rocked, the link will impart swinging movements to the needle gate 18. The frame 20, carries a roller 21 running in a cam groove 22 of a disk 23, and is therefore rocked by said disk. The disk 23 carries a gear 24, and this disk and gear are secured to a stub shaft carried by the standard. The gear 24 meshes with a gear 25 carried by a main shaft 9. These gears are so timed that the needle gate 18 is moved in one direction during one complete reciprocation of the needle bar and in the other direction during the next complete reciprocation of the needle bar.

From the above description it will be apparent that the stitching mechanism proper consists of two spaced needles which are vibrated back and forth, so as to make two separate zig zag lines of stitching. The sections of the fabric to be stitched together indicated at S and S′, Fig. 11 are guided to the stitching mechanism by a spacing edge guide 26. This edge guide 26 is carried by a bar 27, which is mounted to slide endwise in a bracket 28. The bracket 28 has a guideway 29 for the bar. This bracket is positioned underneath the work support 10, and said work support in front of the needles is formed with an opening 30 which permits the guide to be projected up through the work support and into the slot 12ª in the presser foot, or lowered to a position so that the upper face of the guide is substantially flush with the work support. A spring shown in dotted lines at 31, Figs. 2 and 3, is attached at 32 to the bracket, and at 33 to the bar 27. This spring normally holds the guide raised above the work support. The bar is formed with a slot 34, and a screw 35 engaging a washer 36 passes through the slot and holds the bar in the guideway 29 formed in the bracket.

The guide 26 is provided with recesses 37 and 38 in the side walls thereof, which serve to engage and guide the edges of the two sections of the fabric S and S′, see Fig. 12. It will readily be understood that this bar carrying the guide may be depressed or lowered at the will of the operator and without stopping the stitching mechanism, and this will withdraw the guide 26 beneath the upper surface of the work support and allow the edges of the fabric with the connecting cross threads which were first formed in the stitching of the tubular article, to pass over the top of the guide for the finishing operation.

The upward movement of the guide, due to the spring 31, is limited by the upper edge of the bar 27 striking against the under surface of the work support. The edges of the fabric sections are joined by a cross thread $a$, see Fig. 11. In this figure, the needle threads are indicated at $n$ and $n'$. This cross thread $a$, which may be an ornamental thread, is guided by a thread guide 40. The thread guide 40, as clearly shown in Fig. 4, consists of a bent arm having a tubular end through which the thread is led, and this arm is formed with an upwardly projecting shank 41, see Fig. 1, clamped in a sleeve 42, projecting downwardly from an arm 43, see Fig. 4. Said shank is held in the sleeve by a screw 44. This permits the thread guide to be adjusted on the supporting arm 43. The arm 43 is fulcrumed at 45 on a bracket 46, secured to the head of the machine. Said arm carries a ball stud 47 at its outer end, to which is connected a link 48.

The other end of the link 48 is connected to a ball stud 49 carried at the lower end of an arm 50 secured to a rock shaft 51, mounted to oscillate in bearings 52 and 53 carried by a standard. The rock shaft 51 extends through the bearings and carries an arm 54 to which is pivotally connected a link 55. The link 55 is pivoted at its other end at 56 to the needle lever 7. As the needle lever 7 oscillates, the rock shaft 51 will be oscillated, and this through the link 48 and the arm 43 will oscillate the thread guide 40. Said thread guide will make a complete oscillation for each reciprocation of the needles. This thread guide is mounted so as to travel in the arc of a circle, the center of which is at 45, and said thread guide moves from a position in rear of the needles between the two needles to a point in front thereof.

Coöperating with the thread guide is a double thread hook 57. This thread hook 57 is carried by an arm 58. The shank of the hook extends into the arm and is held therein by a screw 59, which permits the hook to be adjusted in the arm. The arm 58 is pivoted at 60 on the extension 61 of the bracket 46. The pivot 60 of the arm 58 is positioned so that the hook 57 swings in a vertical plane. This hook swings in a line in front of both the needles and from a position at one side of the needle 5 to a position at the other side of the needle 6, and below the plane of the thread guide 40.

The arm 58 which carries the hook 57 is integral with an arm 62, and this arm 62 carries a ball stud to which is pivoted a link 63. The link 63 is in turn pivoted to a ball stud carried by an arm 64. The arm 64 is carried by a sleeve 65 freely journaled on the rock shaft 51, the rock shaft serving merely as a support for the arm, and not as an actuating means therefor. The arm 64 carries a ball stud between its ends, to which is connected a link 66. This link 66 at its lower end engages a ball stud 67, carried by a plate 68, adjustably secured to the disk 23. The plate 68 is slotted as at 69, and the screws 70 secure said plate to the disk. These slots are concentric with the axis of the disk. The ball stud 67, however, is eccentric with the axis of the disk, and forms a crank which operates through the link 66 to oscillate the arm 64. This through the link 63 oscillates the thread hook. It will be noted that this thread hook is oscillated from the disk 23, which rotates once for every two rotations of the main shaft, so that the thread hook moves in one direction while the needles make one complete reciprocation and moves in the other direction while the needles make the next complete reciprocation.

The parts are timed so that when the thread guide 40 is in its forward position the hook 57 will be moved across the plane of movement of the thread guide 40, and will engage the thread extending from the end of the thread guide to the previous interlocking of the cross thread with the fabric, and will form a loop or triangle in the thread.

In Fig. 9 of the drawings I have shown the thread hook 57 engaging the cross thread on one of its hooks, and moved into position so as to form the thread into an angle for the needle 5 to enter, and this forms the left hand loop of the "figure 8" stitch. At the next reciprocation of the needles, the thread guide has again moved forward and the thread hook 57 moving in the opposite direction engages the cross thread on its other hook and carries the same to the position shown in Fig. 10.

The cross head extending from the hook 57 to the previous locking of the cross thread to the fabrics, is substantially under the cross thread leading from the hook to the thread guide 40, and in order to form an angle for the entrance of the needle 6, I have provided a thread retaining finger 71. This thread finger 71 is disposed in front of the needle 6 and is carried by the presser foot and projects into the slot 12$^a$ of the foot, so that the cross thread $a$ is carried against the finger 71, and this holds the lower strand of the loop away from the upper strand and permits the needle to pass between the two strands of the loop. The retaining finger 71 is secured to the presser foot by a screw 72, extending through an elongated slot in the shank of the finger, so as to permit the same to be adjusted transversely of the foot. On the opposite side of the presser foot is a finger 39 above referred to, which is secured to the foot by a screw 73.

The cross thread led through the guide 40 passes through spaced thread guides 74 and through a thread guide 75 secured to the arm 43. This thread guide 75 operates to pull off a certain amount of the cross thread from the supply on the rearward movement of the thread guide and give up the thread to the guide as it moves forward.

From the above it would be apparent that the spacing guide 26 extends into the slot 12$^a$ in the presser foot and the presser foot extending along each side of the guide holds the sections of the fabric and directs the same in spaced relation to the needles. It will be obvious from the above description that this holding of the fabric spaced and directing the same to the needles as described permits a cross thread to be joined to the spaced edges and lie in the plane of the fabric or material being stitched.

It is thought the operation of the machine will be apparent from the above description. In joining two edges of sections of fabric such as shown at S, S', in Fig. 11, these two sections are fed to the machine so one edge passes along one side of the guide 26 and the other edge passes along the other side of said guide. The guide 26 during the beginning of the operation if stitching an armhole, is raised and in operative position. The edges of this guide are so positioned that one section of the fabric will pass outside the needle 6 when said needle is at the inner position, as indicated in Fig. 6, while the needle 6 when in its other position will pass down through the section of the fabric. The section of the fabric on the other side of the guide 26 will pass in an opposite relation to the needle 5. In other words, the two needles 5 and 6 will form zig zag stitches which over-edge respective edges of the two sections of fabric being stitched.

The thread guide 40 moves forward and the ornamental thread carried thereby is engaged by the thread hook 57 which moves to the position shown in Fig. 10 and forms a loop of the figure 8 stitch for the entrance of the needle 6 as it passes over the edge of the fabric. The thread guide moves forward again, and a second loop is formed by the hook 57, as shown in Fig. 9, and this forms another loop in the cross thread which is entered by the needle 5 as it passes over the edge of the fabric.

When finishing an armhole or any other type of circular garment, the cross threads which are first laid will be carried around and brought to a position where they would strike the guide 26 which project up between the edges of the fabric sections. When the operator is nearing the finishing of the armhole, the guide 26 is depressed or drawn downward beneath the surface of the work support, and this permits the stitching to continue and overlap the part where the stitching began. Upon releasing the guide it at once returns to normal position.

It is obvious that minor changes in the details of construction and the arrangement of parts may be made, without departing from the spirit of the invention, as set forth in the appended claims.

Having thus described my invention, what I claim as new and desire to secure by Letters Patent, is:—

1. A sewing machine including in combination, spaced needles, means for laying a cross thread to be engaged alternately by said needles, means for guiding fabric sections in spaced relation to the respective needles, whereby said sections may be joined by said cross thread, and means for withdrawing said guiding means at the will of the operator.

2. A sewing machine including in combination, spaced needles, means for actuating said needles and for simultaneously vibrating said needles laterally for forming independent rows of zigzag stitching, means for laying a cross thread between said rows of stitching, a work support, a fabric guide for guiding the edges of sections of fabric to the respective needles, whereby said edges are joined by the cross threads, and means for withdrawing said fabric guide from the plane of the cross threads at the will of the operator.

3. A sewing machine including in combination, spaced needles, means for actuating said needles and for simultaneously vibrating said needles laterally for forming independent rows of zigzag stitching, means for laying a cross thread between said rows of stitching, a work support, a fabric guide for guiding the edges of sections of fabric to the respective needles, whereby said edges are joined by the cross threads, and means for withdrawing said guide beneath the surface of the work support at the will of the operator.

4. A sewing machine including in combination, spaced needles, means for actuating said needles and for simultaneously vibrating said needles laterally for forming independent rows of zigzag stitching, means for laying a cross thread between said rows of stitching, a work support, a fabric guide for guiding the edges of sections of fabric to the respective needles, whereby said edges are joined by the cross threads, means for withdrawing said guide beneath the surface of the work support at the will of the operator, a spring for returning said fabric guide to normal position above the work support, and a stop for limiting the upward movement of said guide.

5. A sewing machine including in combination, spaced needles, means for laying a cross thread in front of said needles, a work support having an opening therethrough in front of the needles, a fabric guide, a supporting bar for said fabric guide, said bar being located beneath the work support and adapted to hold said guide projected through said opening, and means whereby said bar may be moved to withdraw the guide beneath the work support.

6. A sewing machine including in combination, spaced needles, means for laying a cross thread in front of said needles, a work support having an opening therethrough in front of the needles, a fabric guide, a supporting bar for said fabric guide, said bar being located beneath the work support and adapted to hold said guide projected through said opening, means whereby said bar may be moved to withdraw the guide beneath the work support, and a spring for returning said guide to normal position above the work support.

7. A sewing machine comprising in combination, spaced needles, means for laying a cross thread to be engaged alternately by the needles, including a movable thread guide, a movable thread hook, and a normally stationary retainer acting at the same time with said hook and guide upon the cross-thread for forming a loop in said cross thread for the entrance of one of said needles.

8. A sewing machine comprising in combination, spaced needles, means for laying a cross thread to be engaged alternately by the needles, including a thread guide, means for pulling thread from the supply for said movable thread guide, a movable thread hook, a retainer carried by the presser foot and acting at the same time with said thread guide and thread hook upon the said cross thread for forming a loop in said cross thread for one of the needles.

9. A sewing machine comprising in combination, spaced needles, means for laying a cross thread to be engaged alternately by the needles, including a thread guide, means for operating said thread guide, a thread hook, a rotating member, a crank carried by said rotating member, devices operated by said crank for oscillating said hook, and means for adjusting the position of said crank for varying the oscillating position of said hook.

10. A sewing machine including in combination, spaced needles, means for actuating said needles and for laterally vibrating said needles simultaneously for forming independent rows of zigzag stitching, and means for laying a cross thread in the form of the figure 8 between and connected with the inner rows of needle loops of said rows of zigzag stitching.

11. A sewing machine including in combination, a feeding mechanism, spaced needles arranged in a plane diagonal to the line of feed, means for actuating said needles and for laterally vibrating said needles simultaneously for forming independent rows of zigzag stitching, and means for laying a cross thread in the form of the figure 8 between and connected with the inner rows of needle loops of said rows of zigzag stitching.

12. A sewing machine including in combination, spacing needles, means for vibrating said needles laterally for forming independent rows of zigzag stitching, means for guiding spaced edges of fabric to said needles whereby the edges of the fabric will be overseamed by the respective needles, a presser foot engaging the fabric sections on each side of said guiding means for holding and directing the fabric sections in proper relation to the needles, means for laying a cross thread to be engaged alternately by the needles, including a movable thread guide, a movable thread hook, and a normally stationary retainer coöperating with said hook and guide for forming a loop in the cross-thread for the entrance of one of said needles.

In testimony whereof I affix my signature in the presence of two witnesses.

ROBERT R. HUGHES, Jr.

Witnesses:
J. H. HOWELL,
L. ONDERDONK.